United States Patent Office 3,232,605
Patented Feb. 1, 1966

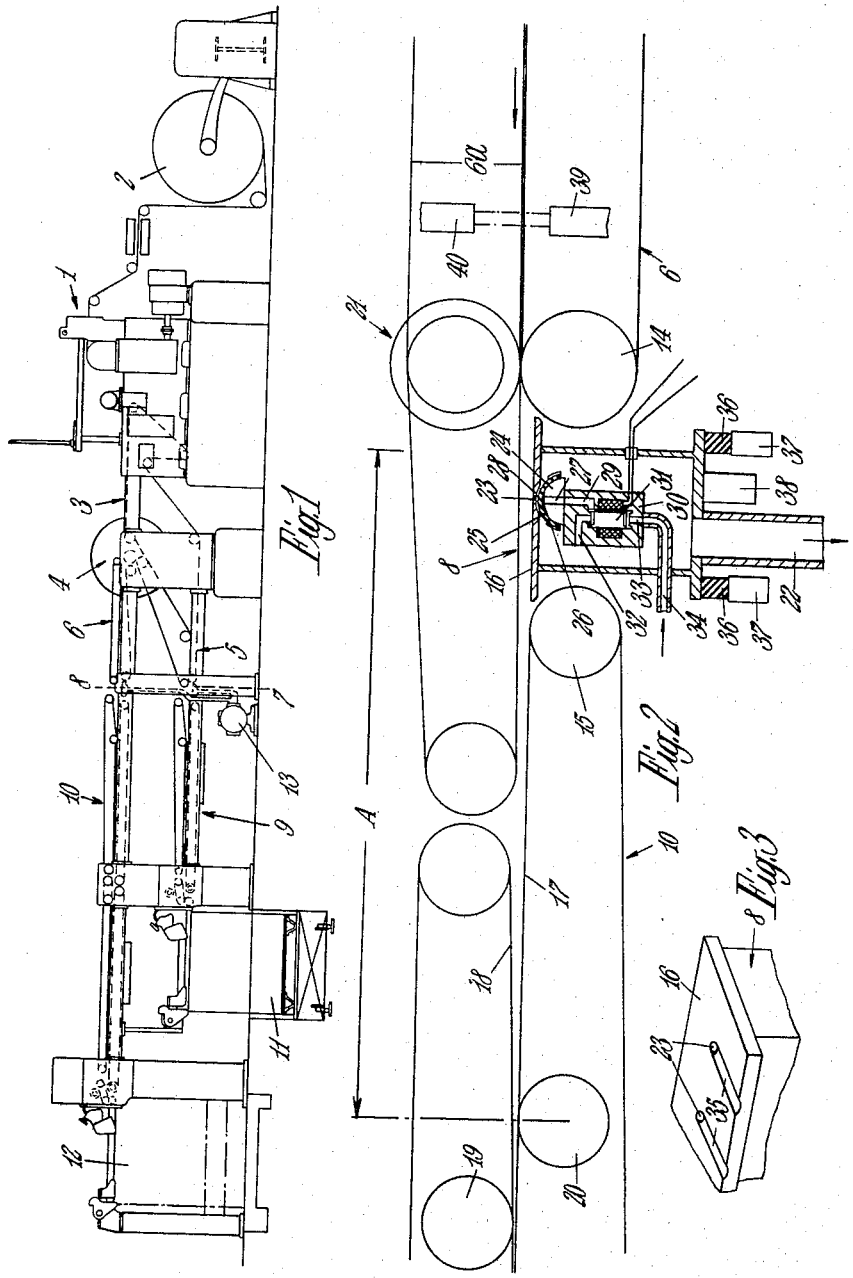

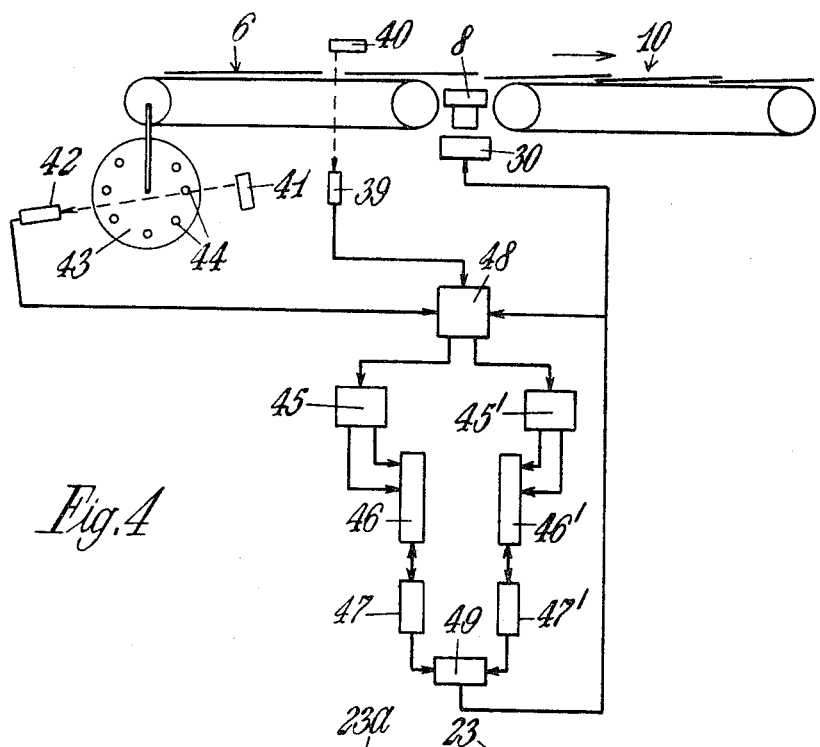
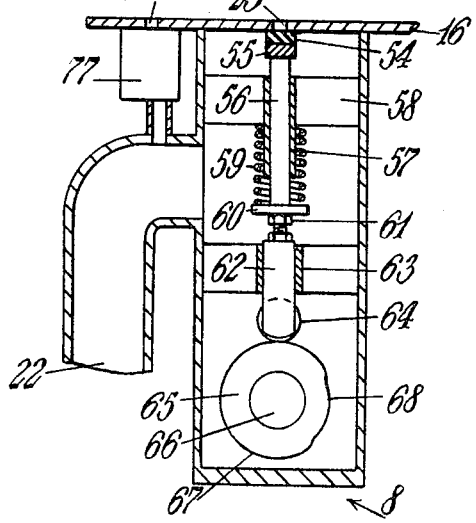

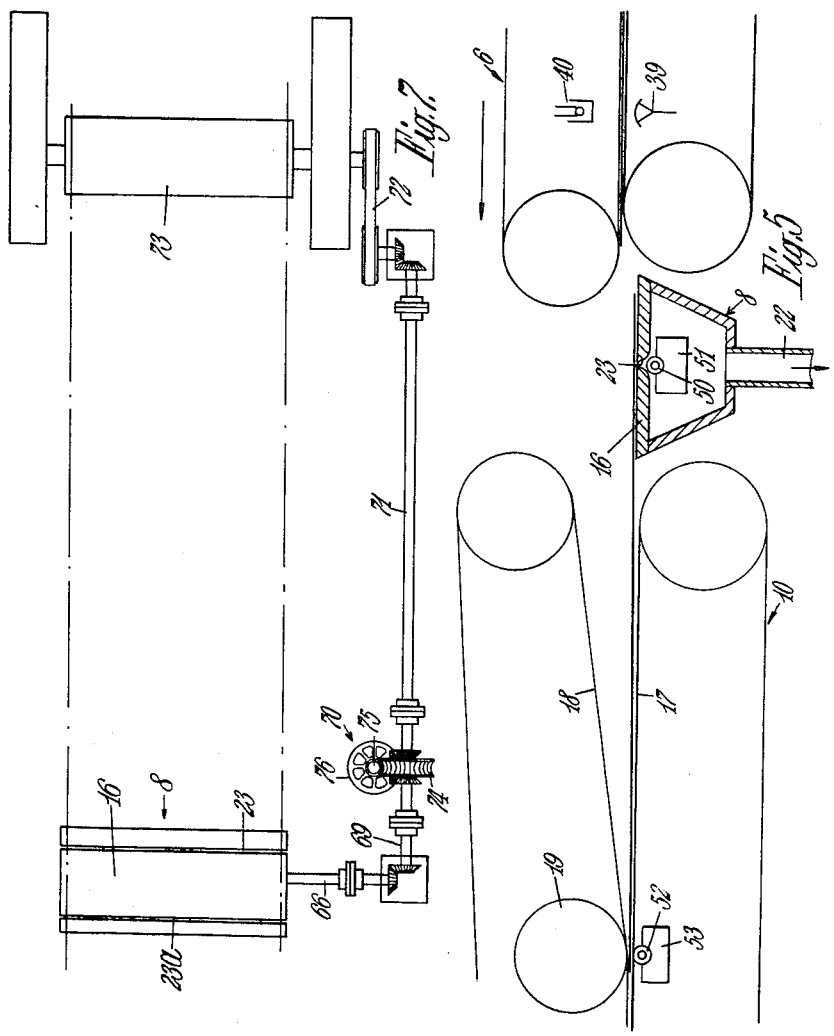

3,232,605
HANDLING OF SHEET MATERIALS
Alan John Regson Plummer, Kent, and Geoffrey Sandle Wynn Thompson, Farnborough, England, assignors to Masson Scott & Company Limited, London, England, a British company
Filed Sept. 23, 1963, Ser. No. 310,561
Claims priority, application Great Britain, Sept. 27, 1962, 36,687/62
9 Claims. (Cl. 271—46)

This invention relates to means for handling papers and other materials in the form of discrete sheets, and is particularly concerned with means for overlapping such sheets on a moving conveyer. The invention will be described with reference to paper-handling machinery but it is to be understood that it is also applicable to board and other sheet materials.

Paper is made and often supplied in the form of rolls which must be cut into sheets before use. The cutting is done by machinery and the cut sheets then have to be stacked in one or more layboys. To be economical in use, particularly when cutting one roll at a time, the machinery must run at a high speed, so that the paper passes through the cutter at say, 600 to 1000 feet per minute or more. However, if the cut sheets enter a layboy at more than about 200 feet per minute there is a considerable risk that their leading edges will be damaged.

In order to avoid this risk the sheets are transferred from the high-speed conveyer on which they leave the cutter to a low-speed conveyer moving at about 200 feet per minute, and in order to do this the sheets must overlap one another. In previously known systems, the fast moving sheets have been allowed to hit an obstruction in their line of travel, after which they fall onto the slow conveyer, thus overlapping the preceding sheets.

It is evident that known overlapping systems also involve the risk of damaging the leading edges of the sheets. Moreover sheet cutting machinery often includes means for rejecting faulty sheets, thus disturbing the pattern of flow. At high speeds this disturbance could cause damaging collisions between succeeding sheets on attempting to overlap them.

Thus it is almost impossible to run existing machinery at the desired high speeds, especially where coated or otherwise delicate papers are involved, owing to the risk of damage. Accordingly, it is an object of the present invention to provide overlapping means which will enable high speeds to be used without any risk of buckling or damaging the edges of the overlapping sheets.

To this end, the invention consists in a method of and apparatus for overlapping sheet material in which each sheet is successively retarded by the application of a vacuum.

It is to be understood that the word "sheet" as used here includes a spur of individual sheets such as is produced when a single machine is used to cut simultaneously webs of material supplied from two or more rolls. It has been found that the overlapping means according to the invention is effective with such spurs, though its efficacy of course depends on the porosity and other properties of the sheet material.

Preferably, the vacuum is applied near the trailing edge of each sheet as it leaves the fast conveyer and reaches the succeeding slow conveyer, and is released on arrival of the next following sheet to overlap the first sheet, being re-applied to grip the rear part of the following sheet which is released in its turn by a further sheet. This arrangement ensures that, even if there is a gap in the sequence of sheets, a sheet will wait at the beginning of the slow conveyer until another sheet arrives to overlap and release it; thus there is no risk of collisions between succeeding sheets.

Conveniently, the application of the vacuum may be controlled by a photoelectric cell energised by a light beam near the end of the fast conveyer, the beam being interrupted by sheets on the conveyer so as to release the vacuum.

Alternatively, if a scanner is provided for detecting faults in sheets leaving a cutter, this scanner may be used to control the release and re-application of vacuum whenever a good sheet passes it. Again if there is no provision for rejecting sheets the vacuum may be controlled by the operation of the cutting knives since the succession of sheets will in this case be quite regular. Yet again if there is rejection the vacuum may still be controlled by the cutting knives and a separate pulsed system installed to take care of gaps caused by deflected sheets; this arrangement is described later.

The invention will be fully understood from the following description taken in conjunction with the accompanying drawings in which:

FIGURE 1 is a general view of machinery for cutting and stacking paper;

FIGURE 2 is a schematic enlarged view, partly in section, of an overlapping device for use in the plant shown in FIGURE 1;

FIGURE 3 is a detail, in perspective, of FIGURE 2;

FIGURE 4 is a schematic representation of a control circuit for the overlapping device of FIGURE 2;

FIGURE 5 is a view corresponding to FIGURE 2 of an alternative arrangement;

FIGURE 6 is a sectional view of part of a mechanically controlled overlapping device; and FIGURE 7 is a plan view of a control system for the device of FIGURE 6.

The plant shown in FIGURE 1 includes a cutter indicated generally at 1 which receives paper from a roll 2, slits it longitudinally and cuts it transversely into sheets by means of a blade mounted on a rotating drum cooperating with a fixed blade; such cutters are well known and will not be further described.

The sheets leaving the cutter fall on to a fast (e.g. 600 feet/minute) conveyer, indicated generally at 3, whose speed is slightly greater than that at which paper enters the cutter so that gaps are produced between succeeding sheets. The conveyer 3 carries the sheets to a deflecting assembly indicated generally at 4, which deflects faulty sheets (e.g. in response to signals from a scanning photocell) onto a fast reject conveyer indicated at 5. Good sheets continue on a fast conveyer indicated generally at 6.

The fast conveyers 5 and 6 deliver the rejected and good sheets respectively across stopping boxes 7 and 8 to slow conveyers 9 and 10 which lead to layboys 11 and 12. The stopping boxes 7 and 8 are identical and further description will refer only to stopping box 8.

The stopping box forms the heart of the means for overlapping sheets on the slow conveyer, which runs at about 200 feet/minute and carries the overlapped sheets to the layboy for stacking. It consists of a hollow box extending across all or part of the width of the conveyer and permanently connected to a vacuum pump 13. If the conveyer carries several parallel streams of sheets, as is the case where cutter 1 slits the paper longitudinally, it may be advantageous to provide a separate box and associated control system for each stream. The following description however relates only to single boxes.

FIGURE 2 shows in more detail the region of the stopping box 8. This is disposed between the lower end rollers 14, 15 of the fast and slow conveyers 6, 10 respectively. Each conveyer consists in known manner of upper and lower sets of parallel moving tapes between which the sheets are carried. The upper tapes 6a of the fast conveyer are extended over the stopping box and the slow roller 15, and the flat top plate 16 of the stopping box is placed so as to guide the sheets from conveyer 6 to conveyer 10. The slow conveyer 10 has cotton lower tapes 17 and elastic upper tapes 18 which are brought together by rolls 19 and 20 so as to produce a gentle nip, sufficient to accelerate a sheet from rest but not enough to form a positive stop for the leading edge of the sheets. Rolls 19 and 20 are carried by a common supporting assembly (not shown) which is movable towards or away from the stopping box so as to make the distance "A" approximately equal to one sheet length. Immediately before the stopping box is a corrugating roll arrangement 21 which ensures that the sheets are projected squarely and uniformly onto the stopping box by the fast conveyer.

The interior of the stopping box is connected by a pipe 22 to the vacuum pump 13. The surface 16 of the box is pierced by one or more slits or holes 23, so that the vacuum maintained in the box by the pump can act on a sheet lying on the top of the box. It has been found that a vacuum of 20 inches of mercury (i.e. 20 inches below atmospheric pressure) suffices to overcome the momentum of a sheet and to hold it firmly on the stopping box against the pull of the slow conveyer 10. The slits or holes, which are disposed in a line across the width of the box, can be isolated from the interior of the box by a valve in the box. The valve shown in FIGURE 2 consists of a part-cylindrical metal support bar 24 to which a flexible elongated rubber diaphragm 25 is sealed along its edges; the uppermost part of the bar is flattened as shown at 26 and communicates with one or more passages 27 in the bar. The underside of the top plate 16 of the box is formed with a shallow groove 28 corresponding in profile to the diaphragm and communicating at its deepest part with the apertures 23. The valve is disposed immediately below this groove.

The passage or passages 27 communicate with a port 29 of a high-speed three way solenoid valve 30. The solenoid valve includes a valve member 31 with sealing surfaces on its end faces and a longitudinal passage, by means of which the port 29 can be connected either to an exhaust port 32 leading directly to the interior of the stopping box or to an inlet port 33 which communicates with a pipe 34 leading to a source of compressed air (not shown). Thus, when air is admitted to passage 27 by movement of valve member 31 to its upper position, diaphragm 25 is inflated and fills groove 28, thus sealing apertures 23. Descent of valve member 31 closes inlet port 33 and connects passage 27 to the interior of the stopping box 8 by way of ports 29 and 32, so that the air contained below diaphragm 25 is rapidly exhausted by the vacuum pump and the diaphragm collapses onto bar 24, allowing the vacuum in the box to act through apertures 23.

It is advantageous if the top surface of the stopping box is formed with longitudinal grooves 35 communicating with the apertures 23, as shown in FIGURE 3.

It is also advantageous if the stopping box 8 is mounted by means of resilient supports such as rubber pads 36 on fixed supports 37 forming part of the machine frame and is vibrated during operation by a vibrator 38, which may be of any convenient known type, e.g. operated by alternating electric current or pneumatic power, producing rapid vibrations of small amplitude.

It will be seen from the above description that if diaphragm 25 is inflated, sheets passing over the top plate 16 will be unaffected by the vacuum in stopping box 8, but if during passage of a sheet the valve 30 is actuated to deflate the diaphragm, the vacuum will act through apertures 23 and will stop the sheet and hold it on the plate 16 until the diaphragm is reinflated by means of compressed air from pipe 34.

When the apertures 23 are re-sealed by reinflation of diaphragm 25, the sheet resting on plate 16 must move away quickly onto slow conveyer 10. Quick release is aided by the grooves 35, which allow air to pass under the sheet to destroy any vacuum remaining under the sheet, and by vibrator 38, whose vibration of the stopping box break down any adhesion caused by static electricity or surface forces.

It will be clear that if the application of vacuum through apertures 23 is pulsed in step with the arrival of new sheets on plate 16 so as to release stopped sheets only when a new sheet reaches the plate 16, the sheets carried on by slow conveyer 10 will be overlapped. A control system for pulsing the vacuum will now be described with reference to FIGURE 4.

The control system includes a photocell 39 and lamp 40 arranged near the end of fast conveyer 6 so that sheets on the conveyer break the beam of light falling on photocell 39 (see also FIGURE 2). The system also includes a pulse generating device consisting e.g. of a lamp 41, a photocell 42, and an interposed perforated disk 43 which rotates in step with and is driven by the fast conveyer 6. The spacing of perforations 44 in disk 43 and the gearing between conveyer 6 and disk 43 are such that the light from lamp 41 passing through perforations 43 causes photocell 42 to produce one pulse for each ¼ inch of travel of the fast conveyer 6.

The control system must take account of two factors: the constant inherent time-lag of the apparatus, and the time taken for the trailing edge of a sheet to travel from photocell 39 to stopping box 8, which varies with the speed of conveyer 6; and must ensure that the vacuum is applied to each sheet as its trailing edge reaches the stopping box and is released as the leading edge of a succeeding sheet reaches the box. To this end, the control system includes two similar parallel circuits, the "vacuum on" circuit consisting of a timing device 45, a counter 46 consisting of a series of binary stages, and an output and self-reset unit 47, while the "vacuum off" circuit similarly consists of timing device 45', counter 46', and output and reset unit 47'. The system is completed by a sequence and pulse shaping unit 48 and a power output sequence unit 49 which actuates the solenoid valve 30.

The system described operates as follows. When the trailing edge of a sheet moves clear of the light beam falling from lamp 40 on photocell 39, the resulting signal from photocell starts timer 45 and also allows the train of pulses from photocell 42 to reach counter 46 via sequence unit 48. During a pre-set period corresponding to the above-mentioned constant inherent time lag, the pulses are fed directly to the second binary counting stage of counter 46 by timer 45. After this pre-set period ends, the pulses are fed to the first binary stage of the counter. When the counter has counted a pre-set number of pulses, equal to the number of ¼ inch spaces between the aforesaid light beam and the position in which it is desired that the trailing edge of the sheet shall stop on the plate 16, units 47 and 49 actuate valve 30 so that diaphragm 25 collapses and vacuum is applied to apertures 23. It will be clear that, because of the diversion of pulses to the second stage of the counter, the counter will register the said pre-set number of pulses before the trailing edge reaches the said desired position, and the time taken by the sheet to cover the remaining distance will be equivalent to the number of pulses fed to the second stage during the said pre-set period and hence will exactly compensate the constant time lag inherent in the apparatus. Consequently the moment of actual application of vacuum through apertures 23 will be that at which the trailing edge of the sheet reaches its desired position, and the sheet will therefore be stopped and held by the vacuum in that position. Unit 47 automatically resets the counter.

When the leading edge of the next succeeding sheet cuts off the light falling on photocell 39, sequence unit 48 feeds pulses from photocell 42 to the "vacuum off" circuit, where a sequence of events identical with that just described occurs, with the exception that sequence unit 49 now causes valve 30 to inflate the diaphragm so as to cut off the vacuum from apertures 23 and release the first sheet, the release occurring as the leading edge of the second sheet slides over the upper surface of the first sheet. The trailing edge of the second sheet is then held by reapplication of vacuum, as described above, until the leading edge of a further sheet arrives. Thus each sheet is successively held on the stopping box until released by the next sheet. If the sheets follow one another in close sequence, as is normal, each sheet will be released while still overlying the preceding sheet, and slow conveyer 10 will therefore carry away a series of overlapped sheets. If a gap occurs in the stream of sheets on conveyer 6, owing to rejection of faulty sheets, say, then the last good sheet will wait on the stopping box until released by a further good sheet. In this way collisions between succeeding sheets are prevented.

The control system described automatically allows for conveyer speed and constant inherent delays, and is unaffected by sheet or gap length. It is however desirable to adjust distance "A" (FIGURE 2) so that when a sheet is held on the stopping box its leading edge is lightly nipped by tapes 17, 18 over roll 20, so as to ensure prompt acceleration of the sheet when released.

FIGURE 5 shows an alternative arrangement of the stopping box and slow conveyer, corresponding parts being indicated by the same reference numbers as are used above. In this device, the valve used to open or close aperture 23 consists of a flexible rubber or polyvinyl chloride seal pipe 50 supported below the aperture, which in this case is a single upwardly tapered slit, by a rigid supporting bar 51; the supporting bar is formed with a semicylindrical groove in which the pipe rests. The pipe can be connected at one or both ends to a source of compressed air and can thus be inflated so as to expand upwards and block slit 23. The valve and control circuit arrangements for controlling the inflation and deflation of the pipe can be substantially identical to those described above with reference to FIGURES 2 to 4. Grooves 35 (FIGURE 3) may be replaced or supplemented by small holes in the top of pipe 50.

The other particular in which the device of FIGURE 5 differs from that of FIGURE 2 is in the nipping assembly used to accelerate sheets from the stopping box 8 onto the slow conveyer 10. More specifically, the lower roll 20 of FIGURE 2 is replaced by a nip pipe 52, similar to pipe 50, supported by a rigid bar 53 under lower tapes 17 and immediately below roll 19. Pipe 52 can also be connected to a source of compressed air. When pipe 52 is deflated there is no nip between tapes 17, 18. It is therefore necessary to drive roll 19 at a speed corresponding to that of tapes 18, to avoid excessive friction and shock when a nip is applied. The roll 19 and bar 53 with pipe 52 are movable together so as to coincide with the leading edge of a sheet held on the stopping box 8. Thus, when pipe 52 is inflated, it lifts lower tapes 17 against upper tapes 18 and a nip is thus produced, gripping any sheet which may be lying on the stopping box and causing it to be accelerated onto slow conveyer 10. Pipes 50 and 52 are inflated simultaneously, but whereas pipe 50 remains inflated until the arrival of the trailing edge of a further sheet, pipe 52 is inflated only momentarily so as to avoid bruising the sheet.

FIGURE 6 shows a third form of stopping box 8, adapted for mechanical instead of electro-pneumatic operation. In this case, the valve for sealing aperture 23, which again has the form of a single slit, is a strip 54 of resilient material such as rubber supported on a light metal bar 55. The bar is supported by a number of rods 56 (only one being shown) moving in guides 57 fixed in the stopping box by supports 58. A compression spring 59 bears between each support 58 and a head 60 on the lower end of the corresponding rod 56 to bias the latter downwards. Head 60 rests on a height-adjusting screw 61 screwed in a push rod 62 moving in a guide 63 fixed in the stopping box. The lower end of push rod 62 carries a roller 64 which bears on a cam 65 fast with a shaft 66 which enters the stopping box through air-tight glands. The cam surface of cam 65 consists of a circular arc 67 and a shorter circular arc 68 of smaller radius.

FIGURE 7 shows a driving arrangement suitable for the stopping box of FIGURE 6. Shaft 66 is driven through bevel pinions by the output shaft 69 of a differential gear indicated at 70 whose input shaft 71 is driven by way of bevel pinions and a chain drive 72 from the rotating drum 73 of the cutter 1. The phase relation between shafts 71 and 69 can be adjusted by rotating the planet wheel assembly of differential 70 by means of a worm wheel 74 fast with the planet wheel assembly and rotatable by means of worm 75 and hand wheel 76. All gear ratios are 1:1, so that cam shaft 66 rotates at the same speed as knife drum 73.

Arcs 67, 68 of cam 65 shown in FIGURE 6 are such that when wheel 64 bears on arc 68, strip 54 drops away from slit 23 under the action of spring 59 and vacuum is applied to an overlying sheet, while when wheel 64 bears on arc 67 the strip 54 closes slit 23 and vacuum is cut off. By suitably adjusting the phase relation by means of handwheel 76, FIGURE 7, the application of vacuum is made to coincide with the arrival of the trailing edge of a sheet on plate 16, and the length of arc 68 is such that vacuum is cut off when a succeeding sheet's leading edge reaches the plate 16.

This arrangement is especially suitable where there is no deflecting assembly between cutter 1 and stopping box 8. If a deflecting assembly is provided, the stopping box is further modified as shown in FIGURES 6 and 7 by the provision of a second slit 23a in plate 16 downstream of slit 23. Slit 23a can be connected to vacuum pipe 22 by a solenoid valve 77. When a gap is created in the stream of sheets, valve 77 is operated to apply vacuum to slit 23a so as to retain on the stopping box the last sheet before the gap, even when slit 23 is opened. Since it is only a question of holding an already stationary sheet, the vacuum applied at slit 23a can be small. Slit 23a is closed again when a further sheet reaches the stopping box, so as to release the previously held sheet. Valve 77 can be controlled directly by the deflecting assembly, or by a photocell and electronic control system similar to that described above. The extra slit 23a prevents collisions between succeeding sheets which might occur if the sheet preceding a gap were not held back.

It is to be understood that the embodiments described are merely exemplary and that other arrangements are possible within the scope of the invention. Thus, instead of using a photocell 39 to control the system shown in FIGURES 2 to 4, a micro switch operated by the knife drum could be used in conjunction with a similar timing system, an additional slit being provided as shown in FIGURES 6 and 7 if necesssary.

We claim:

1. An apparatus for overlapping succeeding sheets of a stream of sheets proceeding from a fast to a slow conveyer, including a hollow box disposed between the conveyers adapted to apply a vacuum successively to each sheet to retard the sheet, said hollow box having an upper surface lying immediately below the path of the sheets and provided with one or more apertures communicating with the interior of the box, a flexible member within the box disposed below the one or more apertures for closing the apertures, means for supplying compressed air to the flexible member to inflate the same whereby the flexible member is held against and closes the one or more apertures, and a vacuum line connected to the box for maintaining the interior of the box under vacuum.

2. The apparatus as claimed in claim 1, in which the flexible member is an elongated flexible diaphragm, and including an elongated rigid supporting bar disposed in the box, the diaphragm being sealed along its edges to the supporting bar, one or more passages being provided in the bar communicating with the interface of diaphragm and bar, a compressed air line leading into the box, and a valve in the box for connecting said passage or passages either to the compressed air line or the interior of the box.

3. The apparatus as claimed in claim 1, in which the flexible member is a horizontal flexible tube, and including a rigid supporting member supporting the tube over the lower part of its surface and disposed in the box, a compressed air line leading into the box, and a valve in the box for connecting the interior of the tube to the compressed air line or the interior of the box.

4. An apparatus for overlapping succeeding sheets of a stream of sheets proceeding from a fast to a slow conveyer, including a hollow box disposed between the conveyers adapted to apply a vacuum successively to each sheet to retard the sheet, said hollow box having an upper surface lying immediately below the path of sheets and provided with one or more apertures communicating with the interior of the box, means for maintaining a vacuum in the interior of the box, closure means in the box for closing the one or more apertures, and control means for opening the closure means for applying vacuum through the one or more apertures when the trailing edge of a sheet reaches the box for holding the sheet stationary on the box and for closing means for releasing the sheet when the leading edge of the next succeeding sheet reaches the box whereby each sheet is held stationary until the arrival of the succeeding sheet, said control means including means for generating a train of pulses each representing an equal distance of travel of the fast conveyer, a light source on one side of the fast conveyer, a photocell on the other side of the fast conveyer, the light source and photocell being disposed so that a sheet on the fast conveyer will interrupt the beam of light falling on the photocell from the light source, a first timing device, a first counting device consisting of a plurality of binary counting stages, means actuated by the photocell for feeding said pulses to the first timing device when the light beam is interrupted, the timing device being so arranged as to feed said pulses during a pre-set period to the second binary stage of the counting device and thereafter to the first binary stage of the counting device, and the counting device being so arranged as to produce an output signal on reaching a pre-set count, means for applying said output signal to open said closure means, and a second timing device and a second counting device similarly arranged and adapted to close said closure means in response to restoration of said light beam.

5. Apparatus for overlapping succeeding sheets of a stream of sheets proceeding from a fast to a slow conveyer, including a hollow box disposed between the conveyers with its upper surface immediately below the path of the sheets, one or more apertures being provided in said upper surface and communicating with the interior of the box, means for maintaining a vacuum in the interior of the box, an aperture closure member consisting of a strip of resilient material disposed immediately below the aperture or apertures, a rigid support in the box supporting the strip, vertical guides in the box, rods movable in the guides and supporting the rigid support, the rods being resiliently biased downwardly, and a cam rotatable in the box and acting on the rods to raise or lower them, the cam surface consisting of two circular arcs of differing radii.

6. The apparatus as claimed in claim 5, in combination with a rotary sheet cutting machine having a rotating knife drum, and including shaft and gear means by which the cam is rotated in step with and is driven by the knife drum.

7. The apparatus as claimed in claim 6, in which the gear and shaft means include a differential gear having a planet wheel assembly, means for holding the planet wheel assembly stationary during operation, and means for setting the planet wheel assembly in a desired rotative position so as to vary the phase relation between the cam and the knife drum.

8. The apparatus as claimed in claim 5, in which a second aperture is provided in said upper surface downstream of the first-mentioned aperture or apertures, vacuum being applied through said second aperture whenever a gap occurs in the stream of sheets.

9. Apparatus for overlapping succeeding sheets of a stream of sheets proceeding from a fast to a slow conveyer, including a hollow box disposed between the conveyers with its upper surface immediately below the path of the sheets, one or more apertures being provided in said upper surface and communicating with the interior of the box, means for maintaining a vacuum in the interior of the box, a driven roll of the slow conveyer disposed immediately above the path of the sheets, a rigid support below said roll and immediately below said path, a flexible pipe supported over its lower surface on said support, the roll and support being movable together towards or away from said box, and means for momentarily inflating said pipe or closure of said apertures to nip and accelerate a sheet previously held on the box by said vacuum.

References Cited by the Examiner
UNITED STATES PATENTS

| | | | |
|---|---|---|---|
| 479,042 | 7/1892 | West. | |
| 2,033,320 | 3/1936 | Belluche | 271—46 |
| 2,919,789 | 1/1960 | Coakley | 198—35 |
| 3,178,174 | 4/1965 | Schneider | 271—46 |

M. HENSON WOOD, Jr., *Primary Examiner.*

W. F. McCARTHY, *Assistant Examiner.*